(12) United States Patent
Kang et al.

(10) Patent No.: US 12,452,544 B2
(45) Date of Patent: Oct. 21, 2025

(54) INSPECTION SYSTEM FOR ROLL-TO-ROLL EQUIPMENT

(71) Applicant: INTEKPLUS CO., LTD., Daejeon (KR)

(72) Inventors: Sung Yong Kang, Daejeon (KR); Seok Joon Jang, Sejong (KR); Daekab Kwon, Seoul (KR); Young Jun Park, Sejong (KR); Sun Hwan Kim, Daejeon (KR); Changhyun Kwon, Daejeon (KR); Hoyeol Kim, Asan (KR)

(73) Assignee: INTEKPLUS CO., LTD., Daejeon (KR)

( * ) Notice: Subject to any disclaimer, the term of this patent is extended or adjusted under 35 U.S.C. 154(b) by 0 days.

(21) Appl. No.: 18/581,970

(22) Filed: Feb. 20, 2024

(65) Prior Publication Data

US 2024/0284054 A1    Aug. 22, 2024

(30) Foreign Application Priority Data

Feb. 21, 2023    (KR) .................. 10-2023-0022720

(51) Int. Cl.
*H04N 23/74*    (2023.01)
*H04N 23/52*    (2023.01)
(Continued)

(52) U.S. Cl.
CPC ............ *H04N 23/74* (2023.01); *H04N 23/52* (2023.01); *H04N 23/695* (2023.01); *H04N 23/90* (2023.01); *H01M 4/0402* (2013.01)

(58) Field of Classification Search
CPC ... G01N 2021/8835; G01N 2021/8908; G01N 21/8806; G01N 21/8901; G01N 21/952;
(Continued)

(56) References Cited

U.S. PATENT DOCUMENTS 5,087,822 A      2/1992   Fairlie et al.
11,100,626 B2 *  8/2021   Roepke ............ G05B 19/41805
(Continued)

FOREIGN PATENT DOCUMENTS

KR    10-1775213 B1    9/2017

OTHER PUBLICATIONS

Extended European search report issued on Jul. 22, 2024, in counterpart European Patent Application No. 24158514.0 (10 pages).

*Primary Examiner* — Boubacar Abdou Tchoussou
(74) *Attorney, Agent, or Firm* — NSIP Law

(57) ABSTRACT

A pair of vision devices are supported by a base frame while spaced apart from each other in a Y-axis direction, wherein each of the pair of vision devices includes a main illuminator which obliquely emits light with respect to a normal plane of a guide roller to illuminate a target object, a sub-illuminator which illuminates the target object by emitting light to remove a shadow generated by the main illuminator, and a camera disposed between the main illuminator and the sub-illuminator. The X-axis moving unit moves X-axis stages with respect to Y-axis stages in an X-axis direction so that the vision devices move toward or away from the guide roller while supported by the X-axis stages. The Y-axis moving unit moves at least any one of the Y-axis stages with respect to the base frame in the Y-axis direction to adjust a distance between the vision devices.

7 Claims, 12 Drawing Sheets

(51) Int. Cl.
  *H04N 23/695* (2023.01)
  *H04N 23/90* (2023.01)
  *H01M 4/04* (2006.01)

(58) Field of Classification Search
  CPC ... H01M 4/0402; H04N 23/52; H04N 23/695;
         H04N 23/74; H04N 23/90
  See application file for complete search history.

(56) References Cited

U.S. PATENT DOCUMENTS

| | | | |
|---|---|---|---|
| 11,906,446 B2* | 2/2024 | Sakamoto | G01N 21/8806 |
| 2006/0203229 A1 | 9/2006 | Gotoh | |
| 2007/0051258 A1 | 3/2007 | Otoko | |
| 2008/0316483 A1 | 12/2008 | Tai et al. | |
| 2018/0100808 A1 | 4/2018 | Lang et al. | |
| 2019/0242011 A1 | 8/2019 | Gertmann et al. | |
| 2023/0061439 A1* | 3/2023 | Sun | G06T 7/001 |
| 2024/0029236 A1* | 1/2024 | Umehara | G06T 7/001 |
| 2024/0214663 A1* | 6/2024 | Xue | G01N 21/01 |
| 2024/0372161 A1* | 11/2024 | Ko | G01N 21/8806 |
| 2025/0035559 A1* | 1/2025 | Zhao | H01M 10/42 |
| 2025/0060319 A1* | 2/2025 | Floeder | G01N 21/8901 |

* cited by examiner

INSPECTION SYSTEM FOR ROLL-TO-ROLL EQUIPMENT

CROSS-REFERENCE TO RELATED APPLICATION

The present application claims priority and the benefit of Korean Patent Application No. 10-2023-0022720, filed on Feb. 21, 2023, in the Korean Intellectual Property Office, the entire disclosure of which is incorporated herein by reference.

BACKGROUND

1. Field of the Invention

The present invention relates to an inspection system for a roll-to-roll apparatus, and more specifically, to a system which inspects a target object such as a battery electrode manufactured by a roll-to-roll apparatus.

2. Discussion of Related Art

In general, a technology for obtaining an image of a target object through a vision method using a camera and lighting and determining whether the target object has an exterior defect is being used in various fields. Such inspection target objects may be various objects such as flat panel displays, semiconductors, and secondary batteries. Hereinafter, an example of a secondary battery will be described.

Secondary batteries are classified according to a composition of an electrode and an electrolyte, such as lithium-ion batteries, lithium-ion polymer batteries, and lithium polymer batteries, and among these, the lithium-ion polymer battery is less likely to leak electrolyte and is easier to manufacture, and therefore its use is increasing.

In addition, the secondary batteries may be classified according to a shape of an exterior member of a battery, such as cylindrical batteries or prismatic batteries in which an electrode assembly is embedded in a cylindrical or prismatic metal can and pouch batteries in which an electrode assembly is embedded in an aluminum laminate pouch.

In general, an electrode assembly is formed with a structure in which a positive electrode and a negative electrode are stacked with a separator interposed therebetween. A manufacturing process of an electrode assembly may include forming a positive electrode and a negative electrode by coating a surface of a metal foil which is a base material of a positive plate and a negative plate with a positive active material and a negative active material, arranging and laminating the positive electrode and the negative electrode with a separator interposed therebetween, and the like.

Meanwhile, when a secondary battery is manufactured in a state in which an electrode assembly has a defect, the secondary battery may have a defect such as performance degradation of the secondary battery. In particular, in a process of manufacturing an electrode, a defect such as foil exposure may occur due to a failure occurred in a process of coating a metal foil with an active material, and when an electrode assembly is provided with the electrode having the defect, a second defect of the electrode assembly occurs.

When the electrode assembly with such a defect is discarded, problems such as a low yield, waste of resources, and environmental pollution can occur. Accordingly, a method of accurately inspecting a defect of an electrode is required before a laminating process of an electrode assembly is performed.

In this regard, there is a technique as disclosed in Korean Patent Publication No. 10-1775213 (Published on Oct. 31, 2016).

SUMMARY OF THE INVENTION

The present disclosure is directed to providing an inspection system for a roll-to-roll apparatus that is capable of accurately detecting a surface defect of a target object manufactured by a roll-to-roll apparatus.

According to an aspect of the present disclosure, there is provided an inspection system for a roll-to-roll apparatus which inspects a target object that is manufactured by a roll-to-roll apparatus and transferred while partially wound around and supported by an outer circumference of a guide roller in a Y-axis direction, and includes a base frame, a pair of vision devices, an X-axis moving unit, and a Y-axis moving unit.

The pair of vision devices may be supported by the base frame in a state in which the pair of vision devices are spaced apart from each other in a Y-axis direction and correspond to edges of both sides of a target object, wherein each of the pair of vision devices may include a main illuminator which obliquely emits light with respect to a normal plane of the guide roller to illuminate the target object, a sub-illuminator which illuminates the target object by emitting light to remove a shadow generated by the main illuminator, and a camera disposed between the main illuminator and the sub-illuminator to obtain an image from light reflected by the target object illuminated by the main illuminator and the sub-illuminator.

The X-axis moving unit may move X-axis stages with respect to Y-axis stages in an X-axis direction so that the vision devices move toward or away from the guide roller while supported by the X-axis stages. The Y-axis moving unit may move at least any one of the Y-axis stages with respect to the base frame in the Y-axis direction to adjust a distance between the vision devices.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
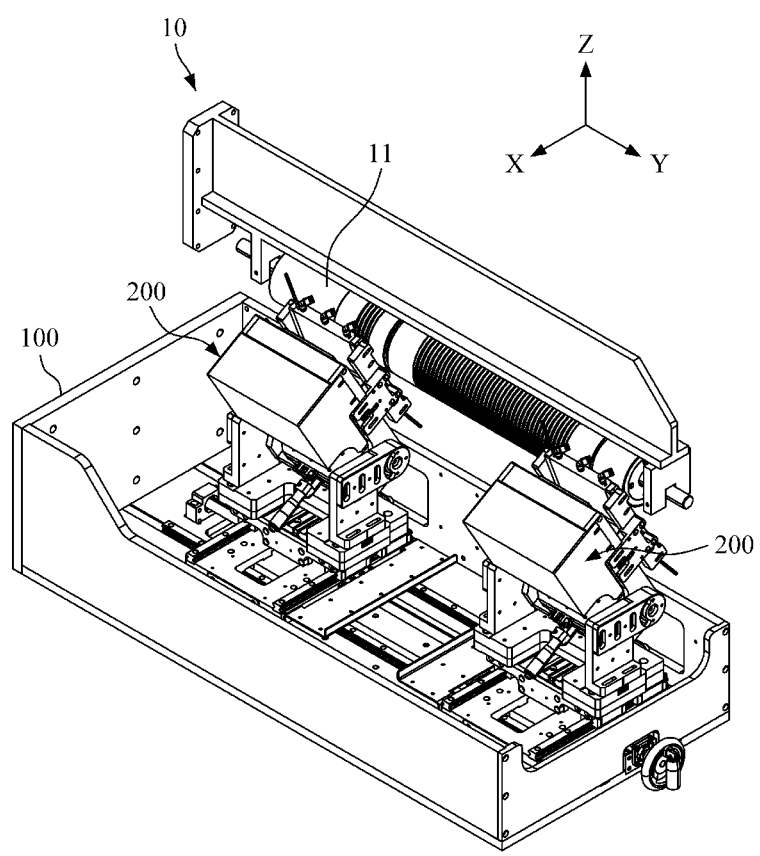
FIG. 1 is a perspective view illustrating an inspection system for a roll-to-roll apparatus according to one embodiment of the present invention.

Hereinafter, the present invention will be described in detail with reference to the accompanying drawings. Here, like reference numerals denote like elements, and repeated descriptions and detailed descriptions of known functions and configurations that may unnecessarily obscure the gist of the present invention will be omitted.

Embodiments of the present invention are provided in order to fully explain the present invention for those skilled in the art. Therefore, shapes and sizes of the elements in the drawings may be exaggerated for clearer description.

Figure 2:
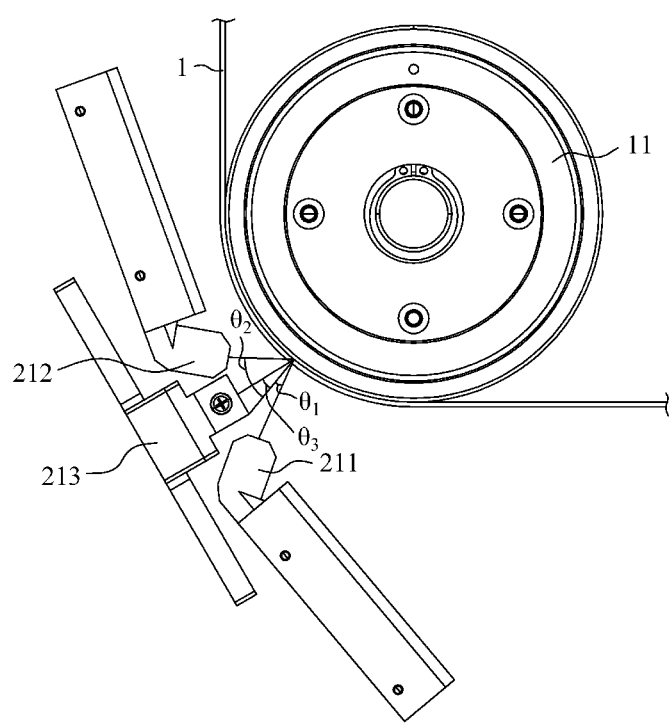
FIG. 2 is a side view illustrating a layout of a camera, a main illuminator, and a sub-illuminator in FIG. 1.
Figure 3:
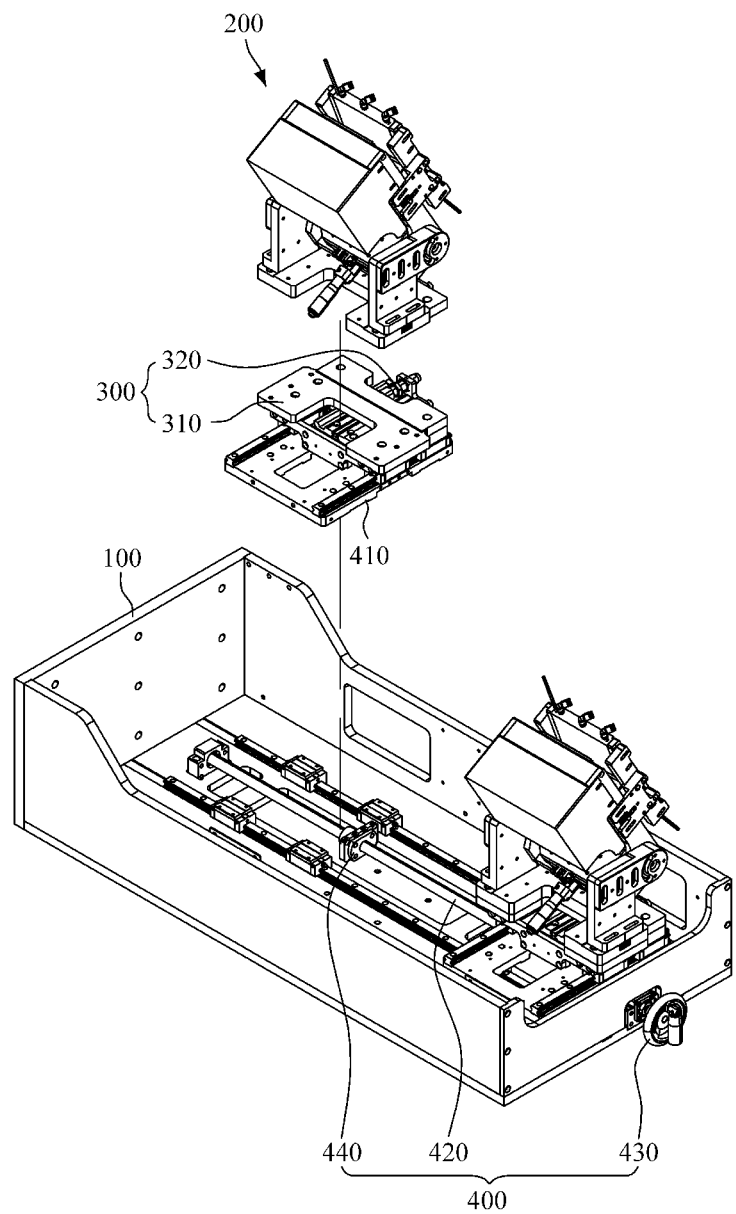
FIG. 3 is an exploded perspective view illustrating a portion of the inspection system for a roll-to-roll apparatus in FIG. 1.
Figure 4:
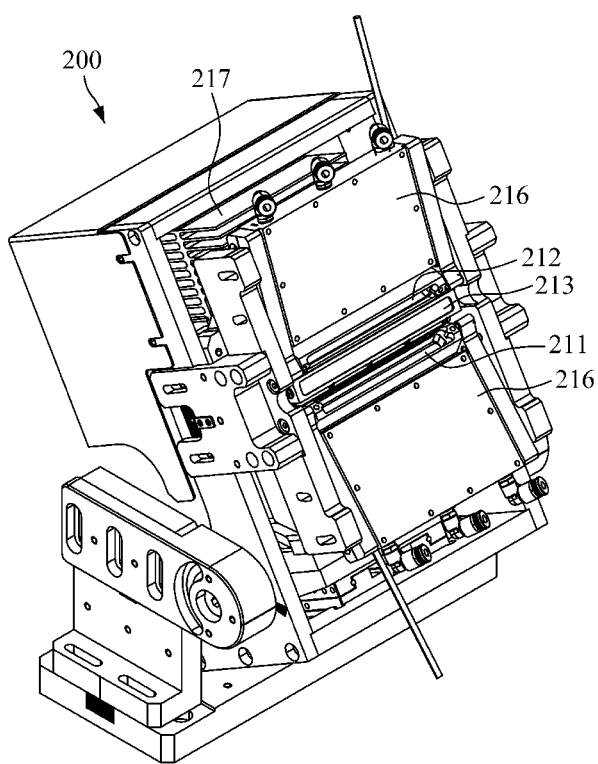
FIG. 4 is a perspective view illustrating a vision device.

FIG. 1 is a perspective view illustrating an inspection system for a roll-to-roll apparatus according to one embodiment of the present invention. FIG. 2 is a side view illustrating a layout of a camera, a main illuminator, and a sub-illuminator in FIG. 1. FIG. 3 is an exploded perspective view illustrating a portion of the inspection system for a roll-to-roll apparatus in FIG. 1. FIG. 4 is a perspective view illustrating a vision device.

Referring to FIGS. 1 to 4, the inspection system for a roll-to-roll apparatus according to one embodiment of the present invention is a system which inspects a target object 1 that is manufactured by a roll-to-roll apparatus 10 and transferred while partially wound around and supported by an outer circumference of a guide roller 11 in a Y-axis direction and includes a base frame 100, a pair of vision devices 200, an X-axis moving unit 300, and a Y-axis moving unit 400.

In this case, the target object 1 may be a target object such as a battery electrode manufactured by the roll-to-roll apparatus 10. The battery electrode may be a positive electrode formed by coating a surface of a positive plate with a positive active material or a negative electrode formed by coating a surface of a negative plate with a negative active material. The inspection target battery electrode may be manufactured in a form in which a metal foil, which serves as a base member of an electrode plate, is machined to form electrode plates in units of cells in the connected form and both surfaces of the electrode plates are coated with an active material in units of cells.

The pair of vision devices 200, the X-axis moving unit 300, and the Y-axis moving unit 400 are mounted on and supported by the base frame 100. The base frame 100 may be fixed to a frame of the roll-to-roll apparatus 10 using a bolt or the like.

The pair of vision devices 200 are supported by the base frame 100 while spaced apart from each other in the Y-axis direction and correspond to edges of both sides of the target object 1, and each includes a main illuminator 211, a sub-illuminator 212, and a camera 213.

The main illuminator 211 obliquely emits light with respect to a normal plane of the guide roller 11 to illuminate the target object 1. The normal plane of the guide roller 11 is a plane perpendicular to a rolling surface of the guide roller 11. The main illuminator 211 may emit light so that the light is incident on each scan line of the target object 1 supported and transferred by the guide roller 11 at a preset incidence angle $\theta_1$ with respect to the normal plane of the guide roller 11.

The main illuminator 211 may be configured to emit light in the form of a line beam. For example, the main illuminator 211 may be formed in a form in which light-emitting elements such as light-emitting diodes (LEDs) or the like are mounted on a substrate in a row. The main illuminator 211 may emit light in the form of the line beam so that the light is incident on the scan line in a state in which the LEDs are arrayed in a longitudinal direction of the scan line.

The sub-illuminator 212 illuminates the target object 1 by emitting light to remove a shadow generated by the main illuminator 211. When the main illuminator 211 obliquely illuminates the target object 1 so that regular reflection occurs, the shadow may be observed by the camera 213. The sub-illuminator 212 may remove the shadow by emitting light toward a region in which the shadow is generated by the main illuminator 211. Accordingly, since the camera 213 may obtain an image in which the shadow is removed, a surface defect of the target object 1 can be accurately detected.

The sub-illuminator 212 may be disposed at a side opposite to the main illuminator 211 with respect to the camera 213 and may obliquely emit light with respect to the normal plane of the guide roller 11 to illuminate the target object 1. When the main illuminator 211 is disposed at a front side based on a transfer direction of the target object 1, the sub-illuminator 212 may be disposed at a rear side. The sub-illuminator 212 may emit light so that the light is incident on each scan line of the target object 1 supported and transferred by the guide roller 11 at a preset incidence angle $\theta_2$ with respect to the normal plane of the guide roller 11.

The sub-illuminator 212 and the main illuminator 211 may be symmetrically disposed with respect to the camera 213. That is, an angle between the sub-illuminator 212 and the camera 213 may be the same as an angle between the main illuminator 211 and the camera 213. The sub-illuminator 212 may be configured to emit light in the form of a line beam. The sub-illuminator 212 may be the same as the main illuminator 211.

In a state in which illuminator cooling modules 216 are mounted on the main illuminator 211 and the sub-illuminator 212, the illuminator cooling modules 216 may receive air through an internal channel and discharge the air to cool the main illuminator 211 and the sub-illuminator 212. When the main illuminator 211 and the sub-illuminator 212 operate, high-temperature heat may be generated by the LEDs, a circuit substrate, and the like, and the illuminator cooling modules 216 may cool the heat.

The illuminator cooling modules 216 receive air supplied from an external air supply source through an inlet port and the internal channel and discharge the air through an outlet port. The illuminator cooling modules 216 may cool heat generated by the main illuminator 211 and the sub-illuminator 212 by exchanging heat with the air of the internal channel. Accordingly, even when the main illuminator 211 and the sub-illuminator 212 are used for a long time, thermal damage to the main illuminator 211 and the sub-illuminator 212 can be prevented by the illuminator cooling modules 216.

The camera 213 is disposed between the main illuminator 211 and the sub-illuminator 212 to obtain an image from light reflected by the target object 1 illuminated by the main illuminator 211 and the sub-illuminator 212. The camera 213 may line-scan the target object 1 supported and transferred by the guide roller 11, obtain an image of the target object 1 at each scan line, and synthesize the images at the scan lines to obtain an entire image of the target object 1. The camera 213 may be provided as a line scan camera including a line sensor. The line sensor may be provided as a complementary metal oxide semiconductor (CMOS) image sensor (CIS) or the like.

The camera 213 may be disposed so that an angle between an image capturing region of the camera 213 and the normal plane of the guide roller 11 is a preset incidence angle $\theta_3$. The camera 213 may be disposed to receive light at the same light reflection angle as a light incidence angle of light incident from the main illuminator 211 with respect to the normal plane of the guide roller 11. For example, when a light incidence angle of the main illuminator 211 is 20 degrees with respect to the normal plane of the guide roller 11, the camera 213 may be disposed to receive light at a light reflection angle of 20 degrees.

A heat sink 217 may be mounted in the camera 213 to absorb heat from the camera 213 and discharge heat. When the camera 213 operates, high-temperature heat may be generated by an image sensor, a circuit substrate, and the like, and the heat sink 217 may absorb and discharge the heat.

The heat sink 217 may include a plurality of heat radiation plates which receive heat generated by the camera 213 and may be mounted on an outer portion of the camera 213. The heat radiation plates may discharge the heat by exchanging heat transferred from the camera with surrounding air. Accordingly, even when the camera 213 is used for a long time, thermal damage to the camera 213 can be prevented by the heat sink 217.

Image data obtained from the camera 213 may be provided to a control unit (not shown) which generally controls the system. The control unit may output a lighting signal for turning on the main illuminator 211 and the sub-illuminator 212 at each scan line of the target object 1 to the main illuminator 211 and the sub-illuminator 212 and an image capturing signal for operating the camera 213 to the camera 213.

The control unit may obtain line data from the camera 213 in a state in which each scan line of the target object 1 is illuminated by the main illuminator 211 and the sub-illuminator 212 and store the line data so that an image of an entire surface of the target object 1 is obtained. The control unit can accurately detect various surface defects of the target object 1 on the basis of obtained image information.

The X-axis moving unit 300 moves X-axis stages 310 in an X-axis direction with respect to Y-axis stages 410 so that the vision devices 200 move toward or away from the guide roller 11 while supported by the X-axis stages 310.

As an example, the X-axis moving unit 300 may include the X-axis stages 310 which support the vision devices 200 and X-axis actuators 320 which move the X-axis stages 310 in the X-axis direction. The X-axis stages 310 may be guided to move in the X-axis direction with respect to the Y-axis stages 410 by a linear motion (LM) guide. The X-axis actuator 320 may include a pneumatic cylinder or the like.

The X-axis moving units 300 may move the vision devices 200 close to the guide roller 11 or move the vision devices 200 to maintenance positions from the guide roller 11. Accordingly, when maintenance of the vision devices 200 is required, the vision devices 200 may be moved to the maintenance positions by the X-axis moving unit 300, repaired, and then returned to inspection positions.

The Y-axis moving unit 400 moves at least any one of the Y-axis stages 410 in the Y-axis direction with respect to the base frame 100 to adjust a distance between the vision devices. As an example, the Y-axis moving unit 400 may include the Y-axis stages 410 guided to move to the base frame 100 by an LM guide, a screw 420 disposed to extend in the Y-axis direction and rotatably supported by the base frame 100, a handle 430 coaxially fixed to one end of the screw 420, and a nut member 440 fixed to any one of the Y-axis stages 410 and screw-coupled to the screw 420.

As a user rotates the handle 430 to rotate the screw 420, the Y-axis moving unit 400 moves the nut member 440 in the Y-axis direction to move one vision device 200 fixed to the nut member 440 close to the other vision device 200 or to move the one vision device 200 away from the other vision device 200 in the Y-axis direction. Accordingly, the Y-axis moving unit 400 may increase or decrease a distance between the vision devices 200 according to a rotary direction of the handle 430. When a width of the target object 1 in the Y-axis direction is changed, the distance between the vision devices 200 may be adjusted to correspond to a width of the target object 1 in the Y-axis direction by the Y-axis moving unit 400.

According to the inspection system 100 for a roll-to-roll apparatus, since an image for accurately detecting various surface defects, for example, a defect such as foil exposure due to a failure in a process of coating a metal foil with an active material, of the target object 1 manufactured by the roll-to-roll apparatus 10 is effectively obtained, inspection accuracy can be improved.

Figure 5:
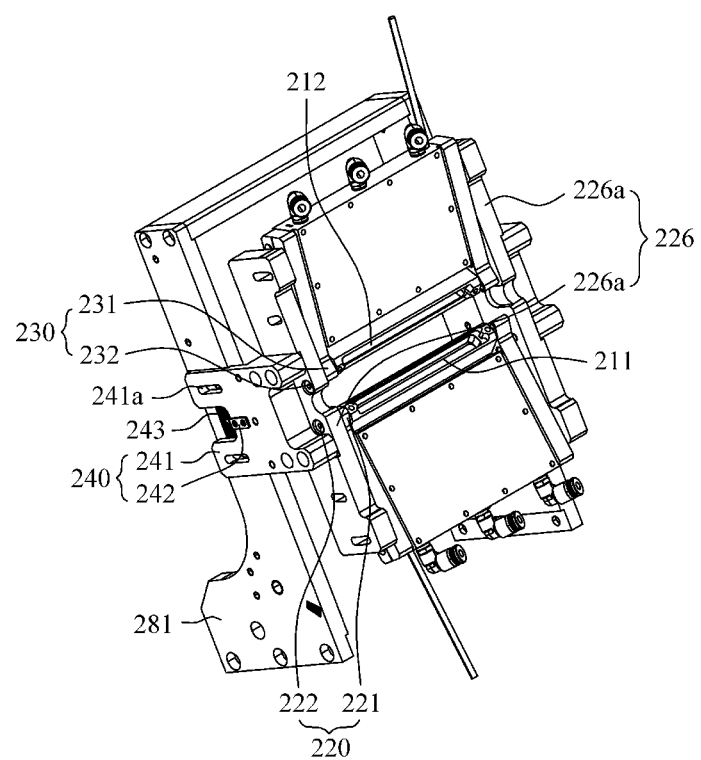
FIG. 5 is a perspective view illustrating the main illuminator and the sub-illuminator of the vision device.
Figure 6:
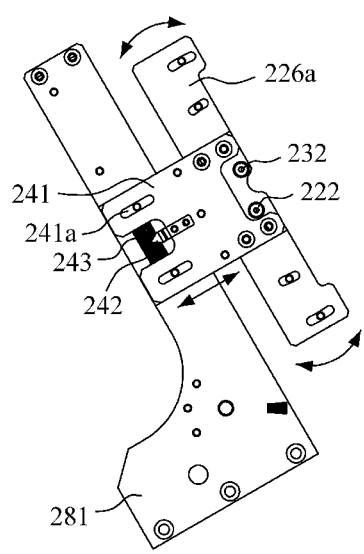
FIG. 6 is a side view for describing tilting and position adjusting of the main illuminator and the sub-illuminator.

FIG. 5 is a perspective view illustrating the main illuminator and the sub-illuminator of the vision device. FIG. 6 is a side view for describing tilting and position adjusting of the main illuminator and the sub-illuminator;

Referring to FIGS. 5 and 6, each of the vision devices 200 may include a first angle adjuster 220, a second angle adjuster 230, and an illuminator distance adjuster 240.

The first angle adjuster 220 adjusts an angle of the main illuminator 211 with respect to the guide roller 11 by tilting a first tilting block 221 with respect to an illuminator support 226 based on a Y-axis in a state in which the main illuminator 211 is supported by the first tilting block 221. The main illuminator 211 may be adjusted at a preset angle with respect to the normal plane of the guide roller 11 by the first angle adjuster 220.

The illuminator support 226 may be formed to include a pair of support plates 226a. The support plates 226a are laterally spaced from each other in the Y-axis direction, and the main illuminator 211 and the sub-illuminator 212 are disposed therebetween. Screw grooves may be formed in left and right portions of the first tilting block 221. Through holes may be formed in the support plates 226a to correspond to the screw grooves of the first tilting block 221. In a state in which the first tilting block 221 is adjusted at a preset angle with respect to the support plates 226a, as first bolts 222 are fastened to the screw grooves through the through holes, the first tilting block 221 may be fixed to the support plates 226a.

The second angle adjuster 230 adjusts an angle of the sub-illuminator 212 with respect to the guide roller 11 by tilting a second tilting block 231 with respect to the illuminator support 226 based on the Y-axis in a state in which the sub-illuminator 212 is supported by the second tilting block 231. The sub-illuminator 212 may be adjusted at a preset angle with respect to the normal plane of the guide roller 11 by the second angle adjuster 230.

Screw grooves may be formed in left and right portions of the second tilting block 231. Through holes may be formed in the support plates 226a to correspond to the screw grooves of the second tilting block 231. In a state in which the second tilting block 231 is adjusted at a preset angle with respect to the support plates 226a, as second bolts 232 are fastened to the screw grooves through the through holes, the second tilting block 231 may be fixed to the support plates 226a.

The illuminator distance adjuster 240 adjusts distances from the guide roller 11 to the main illuminator 211 and the sub-illuminator 212 at the same time by linearly moving the illuminator support 226. An illuminated position of a portion of the target object 1 wound around the guide roller 11 may be adjusted by the illuminator distance adjuster 240 adjusting the distances from the main illuminator 211 and the sub-illuminator 212 to the guide roller 11.

As an example, the illuminator distance adjuster 240 may include adjustment plates 241. Front portions of the adjustment plates 241 are fixed to outer central portions of the support plates 226a in an illumination direction, and rear portions thereof are disposed to face outer side surfaces of rotating brackets 281.

First long holes 241a may be formed in the adjustment plates 241 in an illuminator distance adjustment direction. Screw grooves may be formed in the outer side surfaces of the rotating brackets 281 to correspond to the first long holes 241a. In a state in which positions of the adjustment plates 241 are adjusted with respect to the rotating brackets 281 in the illuminator distance adjustment direction, as bolts (not shown) are fastened to the screw grooves through the first long holes 241a, the adjustment plates 241 may be fixed to the rotating brackets 281.

An indicating member 242 may be mounted on any one of the adjustment plates 241. A mark 243 may be formed on the outer side surface of the rotating bracket 281 to check a position of the indicating member 242 according to movement of the adjustment plate 241.

Figure 7:
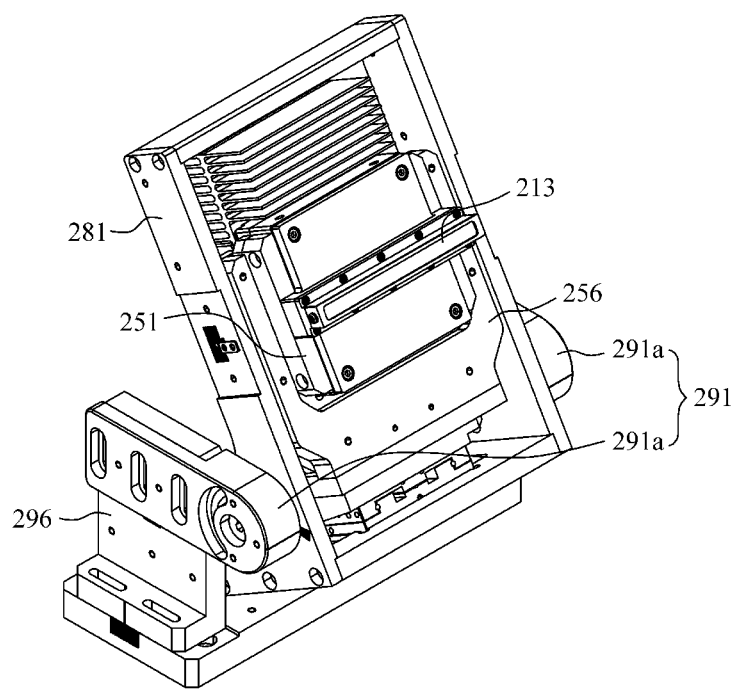
FIG. 7 is a perspective view illustrating the camera of the vision device.
Figure 8:
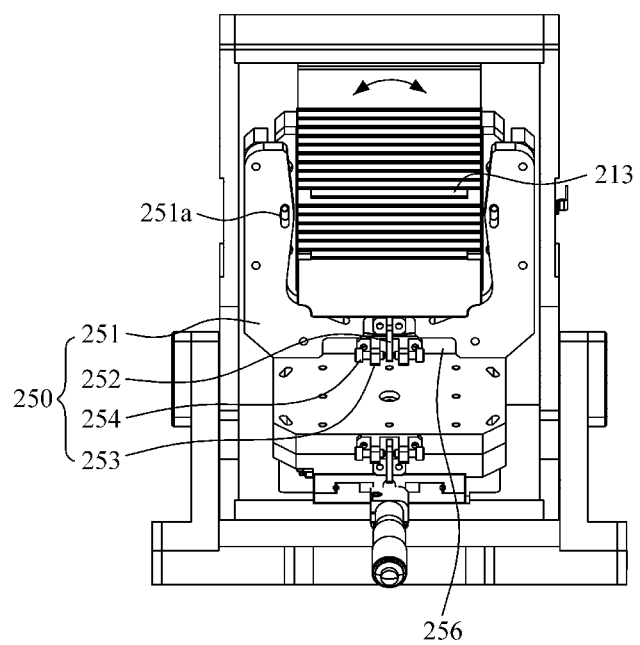
FIG. 8 is a rear view for describing operation of a first rotating unit.
Figure 9:
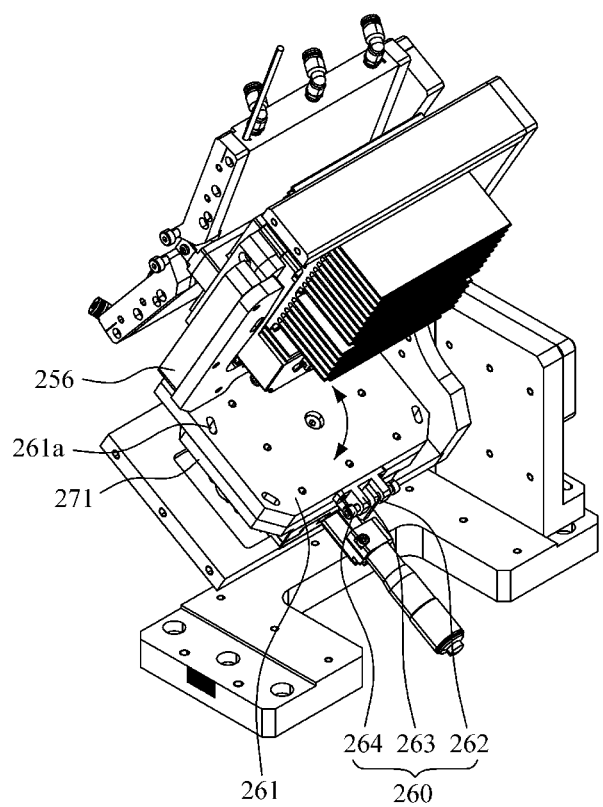
FIG. 9 is a perspective view for describing operation of a second rotating unit.
Figure 10:
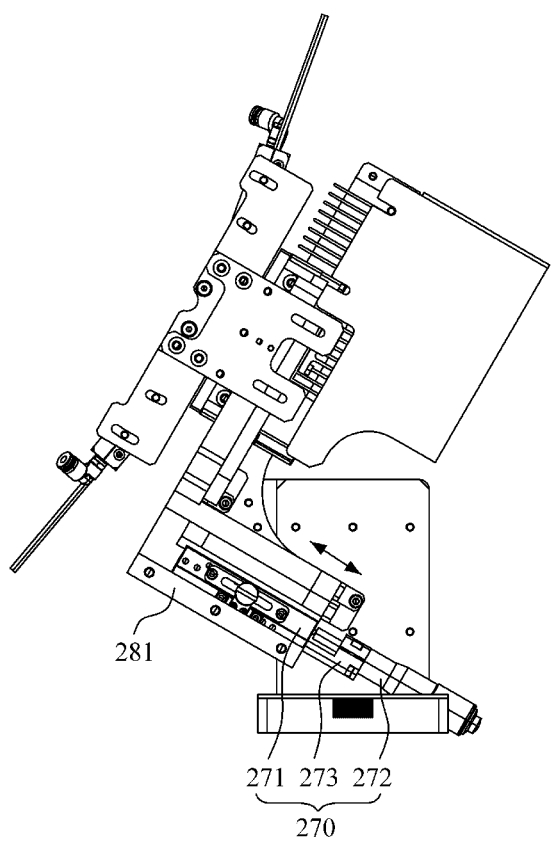
FIG. 10 is a side view for describing operation of a camera distance adjuster.
Figure 11:
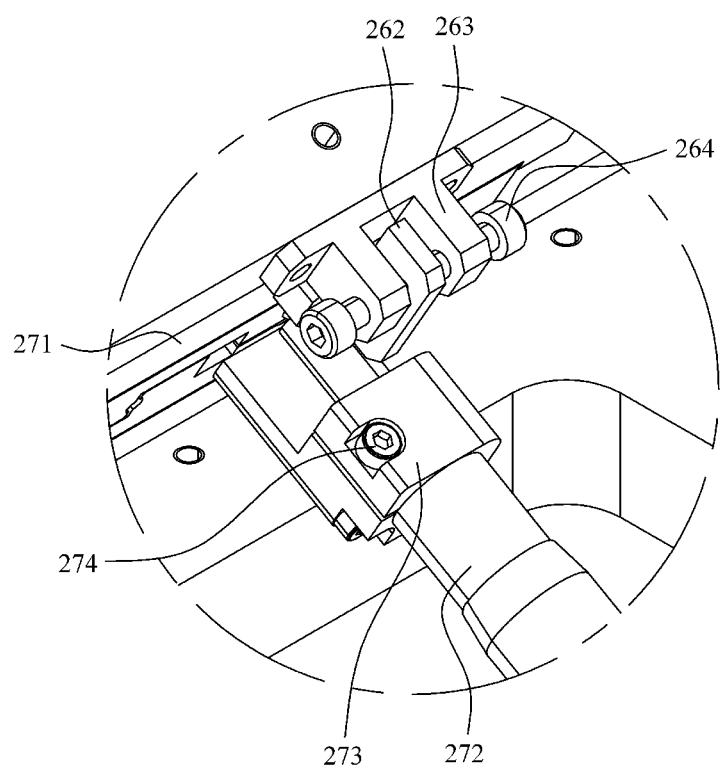
FIG. 11 is a perspective view illustrating a portion of the camera distance adjuster in FIG. 10.
Figure 12:
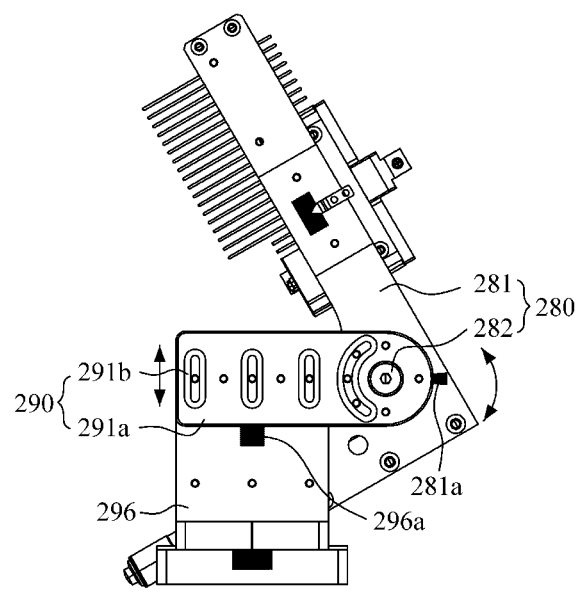
FIG. 12 is a side view for describing operation of a third rotating unit and a Z-axis moving unit.

FIG. 7 is a perspective view illustrating the camera of the vision device. FIG. 8 is a rear view for describing operation of a first rotating unit. FIG. 9 is a perspective view for describing operation of a second rotating unit. FIG. 10 is a side view for describing operation of a camera distance adjuster. FIG. 11 is a perspective view illustrating a portion of the camera distance adjuster in FIG. 10. FIG. 12 is a side view for describing operation of a third rotating unit and a Z-axis moving unit.

Referring to FIGS. 7 to 12, each of the vision devices may include a first rotating unit 250, a second rotating unit 260, a camera distance adjuster 270, a third rotating unit 280, and a Z-axis moving unit 290.

As illustrated in FIG. 8, the first rotating unit 250 rotates a first rotating stage 251 with respect to a rotating block 256 based on an optical axis of the camera 213 in a state in which the camera 213 is supported by the first rotating stage 251. The line sensor of the camera 213 may be aligned parallel to a longitudinal direction of the guide roller 11 by the first rotating unit 250.

As an example, the first rotating unit 250 may include the first rotating stage 251, a first operating piece 252, a pair of first bolt fastening pieces 253, and a pair of first manipulation bolts 254.

The first rotating stage 251 supports the camera 213. First arc-shaped holes 251a may be formed along a central circumference of the first rotating stage 251, and screw grooves may be formed in the rotating block 256 to correspond to the first arc-shaped holes 251a. The first rotating stage 251 may be rotatably supported by the rotating block 256 by fastening guide pins (not shown) to the screw grooves through the first arc-shaped holes 251a.

The first operating piece 252 is formed eccentric to the first rotating stage 251. The first bolt fastening pieces 253 are formed on the rotating block 256 so that the first operating piece 252 is disposed between the first bolt fastening pieces 253 spaced apart from each other. A rotation angle of the first rotating stage 251 may be adjusted by screw-fastening the first manipulation bolts 254 to the first bolt fastening pieces 253 to adjust a position of the first operating piece 252 according to a difference in extent of the mutual screw-fastening.

As illustrated in FIG. 9, the second rotating unit 260 rotates a second rotating stage 261 perpendicularly connected to the rotating block 256 based on an axis perpendicular to both the optical axis of the camera 213 and the Y-axis with respect to a moving block 271. The line sensor of the camera 213 may be aligned to have a constant distance from the guide roller 11 in the longitudinal direction by the second rotating unit 260.

As an example, referring to FIGS. 9 and 11, the second rotating unit 260 may include the second rotating stage 261, a second operating piece 262, a pair of second bolt fastening pieces 263, and a pair of second manipulation bolts 264.

The second rotating stage 261 is axially coupled to and rotatably supported by the moving block 271. Second arc-shaped holes 261a may be formed along a central circumference of the second rotating stage 261, and screw grooves may be formed in the moving block 271 to correspond to the second arc-shaped holes 261a. The second rotating stage 261 may be more stably rotatably supported by the moving block 271 by fastening guide pins (not shown) to the screw grooves through the second arc-shaped holes 261a.

The second operating piece 262 is formed eccentric to the moving block 271. The second bolt fastening pieces 263 are formed on the second rotating stage 261 so that the second operating piece 262 is disposed between the second bolt fastening pieces 263 spaced apart from each other. A rotation angle of the second rotating stage 261 may be adjusted by screw-coupling the second manipulation bolts 264 to the second bolt fastening pieces 263 to adjust a position of the second operating piece 262 according to a difference in extent of the mutual screw-fastening.

As illustrated in FIGS. 10 and 11, the camera distance adjuster 270 moves the moving block 271 in an optical axis direction of the camera 213 with respect to the rotating bracket 281. In a state in which the line sensor of the camera 213 is aligned to have a constant distance from the guide roller 11 in the longitudinal direction by the second rotating unit 260, a focal length of the target object 1 may be adjusted by the camera distance adjuster 270.

The moving block 271 may be guided to move to the rotating bracket 281 in the optical axis direction of the camera 213 by an LM guide. A manipulation rod 272 may be disposed on and connected to the moving block 271 parallel to a moving direction. The user may hold the manipulation rod 272 and move the moving block 271.

A locking block 273 may be formed on the rotating bracket 281. The locking block 273 may be formed in a form in which the locking block 273 surrounds an outer circumference of the manipulation rod 272 and in which both ends are spaced apart from each other and face each other. The manipulation rod 272 may be fastened or released by fastening or releasing both ends of the locking block 273 to or from each other with a locking bolt 274. Accordingly, in a state in which a position of the moving block 271 is adjusted with respect to the rotating bracket 281, the moving block 271 may be fixed to the rotating bracket 281 by locking the manipulation rod 272.

As illustrated in FIG. 12, the third rotating unit 280 rotates the rotating bracket 281 with respect to a rotating support 291 based on the Y-axis. A distance from the camera 213 together with the main illuminator 211 and the sub-illuminator 212 to the guide roller 11 may be adjusted by the third rotating unit 280.

The rotating support 291 may be formed to include a pair of support blocks 291a. The support blocks 291a are laterally spaced from each other in the Y-axis direction, and the rotating bracket 281 is disposed between the support blocks 291a. Screw grooves may be formed in left and right portions of the rotating bracket 281. Through holes may be formed in the support blocks 291a to correspond to the screw grooves of the rotating bracket 281.

In a state in which the rotating bracket 281 is adjusted at a preset angle with respect to the support blocks 291a, the rotating bracket 281 may be fixed to the support blocks 291a by fastening third bolts 282 to the screw grooves through the through holes. A mark 281a may be formed on the outer side surface of the rotating bracket 281 to check a rotation position.

The Z-axis moving unit 290 moves the rotating support 291 in a Z-axis direction with respect to a pedestal 296 supported by the X-axis stage 310. A level of the camera 213 together with the main illuminator 211 and the sub-illuminator 212 with respect to the guide roller 11 in the Z-axis direction may be adjusted by the Z-axis moving unit 290.

The pedestal 296 is disposed between the support blocks 291a of the rotating support 291. Second long holes 291b may be formed in the support blocks 291a in the Z-axis direction. Screw grooves may be formed in an outer side surface of the pedestal 296 to correspond to the second long holes 291b.

In a state in which positions of the support blocks 291a are adjusted in the Z-axis direction, the support blocks 291a may be fixed to the pedestal 296 by coupling bolts (not shown) to the screw grooves through the second long holes 291b. A mark 296a may be formed on the outer side surface of the pedestal 296 to check a moved position of the support block 291a.

As described above, according to the apparatus inspection system for a roll-to-roll apparatus of the present embodiment, as an accurate image is obtained by accurately aligning the camera 213, the main illuminator 211, and the sub-illuminator 212 with the target object 1 to correspond to preset positions and preset angles, inspection accuracy can be improved.

The present invention has been described with reference to embodiments illustrated in the accompanying drawings, but the embodiments are merely exemplary. It will be understood by those skilled in the art that various modifications and other equivalent embodiments are possible. Therefore, the scope of the present invention is defined by the appended claims.

What is claimed is:

1. An inspection system for a roll-to-roll apparatus, which inspects a target object manufactured by a roll-to-roll apparatus that is transferred while partially wound around and supported by an outer circumference of a guide roller in a Y-axis direction, the inspection system comprising:
   a base frame;
   a pair of vision devices which are supported by the base frame while spaced apart from each other in a Y-axis direction and correspond to edges of both sides of a target object, wherein each of the vision devices includes a main illuminator which obliquely emits light with respect to a normal plane of the guide roller to illuminate the target object, a sub-illuminator which illuminates the target object by emitting light to remove a shadow generated by the main illuminator, and a camera disposed between the main illuminator and the sub-illuminator to obtain an image from light reflected by the target object illuminated by the main illuminator and the sub-illuminator;
   an X-axis actuator which moves X-axis stages with respect to Y-axis stages in an X-axis direction so that the vision devices move toward or away from the guide roller while supported by the X-axis stages; and
   a Y-axis actuator which moves at least any one of the Y-axis stages with respect to the base frame in the Y-axis direction to adjust a distance between the vision devices,
   wherein each of the vision devices includes:
   a first angle adjusting assembly which adjusts an angle of the main illuminator with respect to the guide roller by tilting a first tilting block with respect to an illuminator support based on a Y-axis in a state in which the main illuminator is supported by the first tilting block;
   a second angle adjusting assembly which adjusts an angle of the sub-illuminator with respect to the guide roller by tilting a second tilting block with respect to the illuminator support based on the Y-axis in a state in which the sub-illuminator is supported by the second tilting block; and
   an illuminator distance adjusting assembly which adjusts distances from the guide roller to the main illuminator and the sub-illuminator by linearly moving the illuminator support.

2. The inspection system of claim 1, wherein each of the vision devices includes:
   a first rotator which rotates a first rotating stage with respect to a rotating block based on an optical axis of the camera in a state in which the camera is supported by the first rotating stage;
   a second rotator which rotates a second rotating stage perpendicularly connected to the rotating block with respect to a moving block based on an axis perpendicular to both the optical axis of the camera and a Y-axis;
   a camera distance adjusting assembly which rotates the moving block with respect to a rotating bracket in an optical axis direction of the camera;
   a third rotator which rotates the rotating bracket with respect to a rotating support based on the Y-axis; and
   a Z-axis actuator which moves the rotating support with respect to a pedestal supported by the X-axis stage in a Z-axis direction.

3. The inspection system of claim 1, comprising a heat sink which is mounted on the camera, absorbs heat from the camera, and discharges the heat.

4. The inspection system of claim 1, comprising illuminator coolers which receive air through an internal channel and discharge the air to cool the main illuminator and the sub-illuminator in a state in which the illuminator coolers are mounted on the main illuminator and the sub-illuminator.

5. An inspection system for a roll-to-roll apparatus, which inspects a target object manufactured by a roll-to-roll apparatus that is transferred while partially wound around and supported by an outer circumference of a guide roller in a Y-axis direction, the inspection system comprising:
   a base frame;
   a pair of vision devices which are supported by the base frame while spaced apart from each other in a Y-axis direction and correspond to edges of both sides of a target object, wherein each of the vision devices includes a main illuminator which obliquely emits light with respect to a normal plane of the guide roller to illuminate the target object, a sub-illuminator which illuminates the target object by emitting light to remove a shadow generated by the main illuminator, and a camera disposed between the main illuminator and the sub-illuminator to obtain an image from light reflected by the target object illuminated by the main illuminator and the sub-illuminator;

an X-axis actuator which moves X-axis stages with respect to Y-axis stages in an X-axis direction so that the vision devices move toward or away from the guide roller while supported by the X-axis stages; and a Y-axis actuator which moves at least any one of the Y-axis stages with respect to the base frame in the Y-axis direction to adjust a distance between the vision devices, wherein each of the vision devices includes:

a first rotator which rotates a first rotating stage with respect to a rotating block based on an optical axis of the camera in a state in which the camera is supported by the first rotating stage;

a second rotator which rotates a second rotating stage perpendicularly connected to the rotating block with respect to a moving block based on an axis perpendicular to both the optical axis of the camera and a Y-axis;

a camera distance adjusting assembly which rotates the moving block with respect to a rotating bracket in an optical axis direction of the camera;

a third rotator which rotates the rotating bracket with respect to a rotating support based on the Y-axis; and a Z-axis actuator which moves the rotating support with respect to a pedestal supported by the X-axis stage in a Z-axis direction.

6. The inspection system of claim 5, comprising a heat sink which is mounted on the camera, absorbs heat from the camera, and discharges the heat.

7. The inspection system of claim 5, comprising illuminator coolers which receive air through an internal channel and discharge the air to cool the main illuminator and the sub-illuminator in a state in which the illuminator coolers are mounted on the main illuminator and the sub-illuminator.

* * * * *